(12) United States Patent
Sajnovic et al.

(10) Patent No.: US 12,352,351 B2
(45) Date of Patent: Jul. 8, 2025

(54) GEARED MOTOR HAVING A CYLINDRICAL CASING AND CORRESPONDING TUBULAR MOTOR

(71) Applicant: INNOVACTION TECHNOLOGIES, Epercieux St Paul (FR)

(72) Inventors: Srecko Sajnovic, Epercieux St Paul (FR); Sylvain Denis, Villerest (FR)

(73) Assignee: Innovaction Technologies, Épercieux-St.-Paul (FR)

( * ) Notice: Subject to any disclaimer, the term of this patent is extended or adjusted under 35 U.S.C. 154(b) by 226 days.

(21) Appl. No.: 18/005,322

(22) PCT Filed: Jul. 6, 2021

(86) PCT No.: PCT/FR2021/051248
§ 371 (c)(1),
(2) Date: Jan. 12, 2023

(87) PCT Pub. No.: WO2022/008840
PCT Pub. Date: Jan. 13, 2022

(65) Prior Publication Data
US 2023/0272849 A1    Aug. 31, 2023

(30) Foreign Application Priority Data

Jul. 8, 2020 (FR) .................................. 2007238
Sep. 29, 2020 (FR) .................................. 2009887

(51) Int. Cl.
*H02K 7/11* (2006.01)
*F16H 1/28* (2006.01)
(Continued)

(52) U.S. Cl.
CPC ............. *F16H 57/082* (2013.01); *F16H 1/28* (2013.01); *H02K 7/116* (2013.01); *H02K 2207/03* (2013.01)

(58) Field of Classification Search
CPC . B65G 23/08; F16H 1/28; F16H 57/08; F16H 57/082; H02K 2207/03; H02K 7/116
See application file for complete search history.

(56) References Cited

U.S. PATENT DOCUMENTS

2008/0197733 A1\* 8/2008 Oberle ................. H02K 7/1166
74/606 R
2013/0342058 A1\* 12/2013 Suzuki ................. B60K 17/046
310/83

(Continued)

FOREIGN PATENT DOCUMENTS

FR 3016013 A1 7/2015
JP 2002-276742 A 9/2002

OTHER PUBLICATIONS

International Search Report and Written Opinion mailed Oct. 4, 2021, issued in corresponding international Application No. PCT/FR/2021/051248, 13 Pages.

*Primary Examiner* — Naishadh N Desai
(74) *Attorney, Agent, or Firm* — Christensen O'Connor Johnson Kindness PLLC (57) ABSTRACT

Geared motor comprising a planetary gearset (2) coupled to an output shaft of a motor (3), comprising a cylindrical casing (4a, 4b, 4c) isolating the geared motor (1) from the outside, and a hollow shaft (5) connected to the stator of the motor (3) and aligned with the output shaft of the planetary gearset (2).

11 Claims, 7 Drawing Sheets

(51) Int. Cl.
*F16H 57/08* (2006.01)
*H02K 7/116* (2006.01)

(56) References Cited

U.S. PATENT DOCUMENTS

2018/0216390 A1* 8/2018 Takizawa .................. F16H 1/32
2019/0305629 A1* 10/2019 Mans ....................... H02K 5/04
2020/0407907 A1* 12/2020 Lin ......................... D06F 23/02

* cited by examiner

GEARED MOTOR HAVING A CYLINDRICAL CASING AND CORRESPONDING TUBULAR MOTOR

TECHNICAL FIELD

The technical field of the invention is that of geared motors, and more particularly tubular motors fitted with such geared motors.

DISCLOSURE OF THE INVENTION

One object of the invention is a geared motor comprising a planetary gearset coupled to the output shaft of a motor. The geared motor comprises a cylindrical casing isolating the geared motor from the outside and a hollow shaft connected to the stator of the motor and aligned with the output shaft of the planetary gearset, the cylindrical casing comprises a hollow cylinder, at least one front flange and at least one rear flange, the at least one front flange being secured to the case of the planetary gearset, the at least one rear flange being secured to the hollow shaft, the hollow cylinder being fitted, in the vicinity of each of its ends, with an assembly of peripheral cut-outs associated with axial cut-outs each extending from one end of the hollow cylinder to a peripheral cut-out, the front flanges and the rear flanges each being fitted with axial ports and at least two shoulders, each shoulder being capable of cooperating with an assembly formed by an axial cut-out and a peripheral cut-out in the vicinity of one end of the hollow cylinder, so as to form the cylindrical casing and to lock it by rotation of the flanges relative to the hollow cylinder.

The cylindrical casing may comprise two front flanges and two rear flanges, each of the two front flanges and each of the two rear flanges being locked in opposite directions of rotation.

The port in the rear flanges may accommodate the hollow shaft.

The port in the front flanges may accommodate the output shaft of the planetary gearset.

Each flange may comprise five shoulders, the hollow cylinder comprising a corresponding number of assemblies of radial and axial cut-outs.

Each shoulder may be fitted with a groove so that the hollow cylinder engages into the groove on relative rotation of the shoulder and the hollow cylinder.

The motor may be an electric, hydraulic, pneumatic or oleo-pneumatic motor.

The cylindrical casing may comprise a hollow cylinder extending around the planetary gearset and the motor, a front flange integral with the planetary gearset and a rear flange integral with the stator of the motor and the hollow shaft.

The hollow shaft may comprise a port through which the supply and control of the motor pass through the cylindrical casing.

Another object of the invention is also a tubular motor comprising a geared motor as defined above, connected to a rotating drum extending around the cylindrical casing, a front shroud integral with the output axle of the planetary gearset of the geared motor and a rear shroud freely rotatably resting on the hollow shaft (5) of the geared motor, the shrouds being integral with the drum so that the rotation of the output axle of the planetary gearset is transmitted to the drum and the axis of rotation of the rotating drum is coaxial with the axis of rotation of the geared motor extending through the hollow shaft and the output shaft of the planetary gearset.

The rear shroud may be fitted with a bearing cooperating with the hollow shaft so as to decouple the geared motor from the rotation of the rotary drum.

Another object of the invention is an actuation system comprising a tubular motor as described above, arranged in a trim, the actuation system further comprising an attachment of the hollow axle of the rear shroud to the trim, and a drive assembly coupled to the front shroud and adapted to receive a crank, the attachment being adapted to be opened when the actuation system is actuated with the crank.

The tubular motor may be fitted with quick disconnect connectors so as to isolate the tubular motor from its power source when the actuator is actuated with the crank.

BRIEF DESCRIPTION OF THE DRAWINGS

Further purposes, characteristics and advantages of the invention will become apparent upon reading the following description, given by way of non-limiting example only and made with reference to the appended drawings in which.

DETAILED DESCRIPTION

Figure 1:
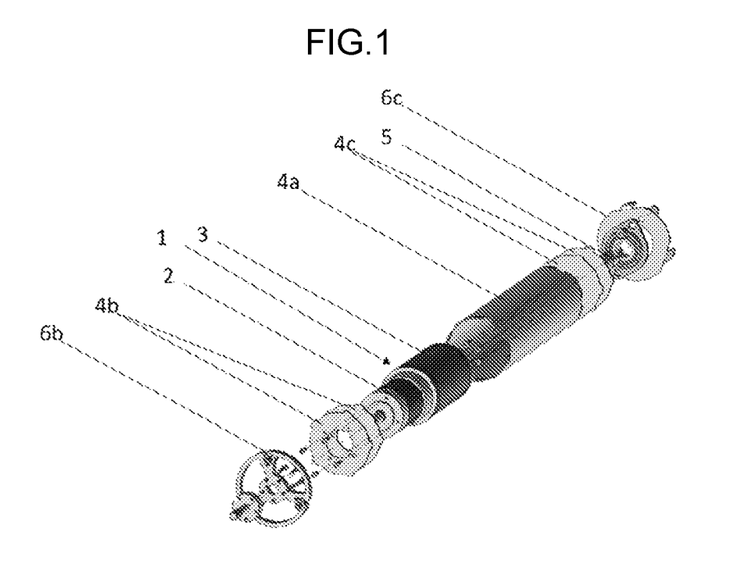
FIG. 1 illustrates a tubular motor according to the invention.

FIG. 1 illustrates a geared motor 1 comprising a planetary gearset 2 mounted via a flange to the periphery of the output shaft of a motor 3, the whole being contained in a cylindrical casing 4a, 4b, 4c. The cylindrical casing 4a, 4b, 4c is fixed and comprises a hollow cylinder 4a closed at its two ends by front flanges 4b and rear flanges 4c.

The geared motor 1 is also fitted with a hollow shaft attached to the stator supported by a rear shroud 6c, the geared motor 1 being moreover fitted with a front shroud 6b connected to the output shaft of the planetary gearset 2.

Figure 2:
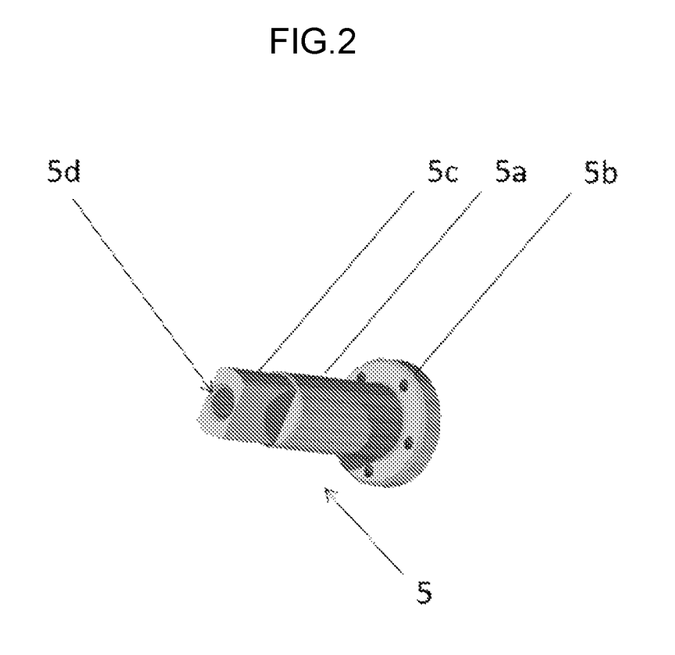
FIG. 2 illustrates a hollow axle of the invention.

FIG. 2 illustrates the hollow shaft 5. It can be seen that it comprises a cylindrical body 5a, fitted at one end with a flat 5b and at the other end with a base 5c, also cylindrical, this base being fitted with perforations designed to cooperate with an attachment system of the rod and bolt type so as to secure the hollow shaft 5 to the stator of the motor 3. The hollow shaft 5 is drilled through so as to obtain a port 5d, through which control cables and supply cables or hoses for the motor 3 can pass.

Figure 3:
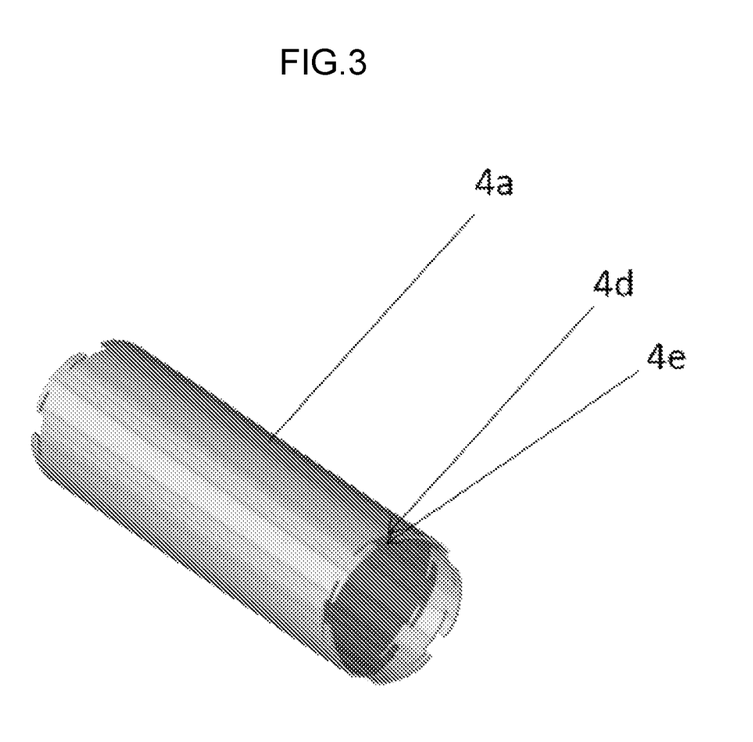
FIG. 3 illustrates a cylindrical casing of the invention.

FIG. 3 illustrates a hollow cylinder 4a comprising, in the vicinity of each of its ends, an assembly of peripheral cut-outs 4d associated with axial cut-outs 4e each extending from one end of the hollow cylinder 4a to a peripheral cut-out 4d. The assembly formed by an axial cut-out 4e and a peripheral cut-out 4d is designed so that a shoulder 4f provided in a flange 4b, 4c can be translationally inserted into the axial cut-out 4e and then locked in the peripheral cut-out 4d by relative rotation of the flange 4b, 4c relative to the hollow cylinder 4a.

Figure 4:
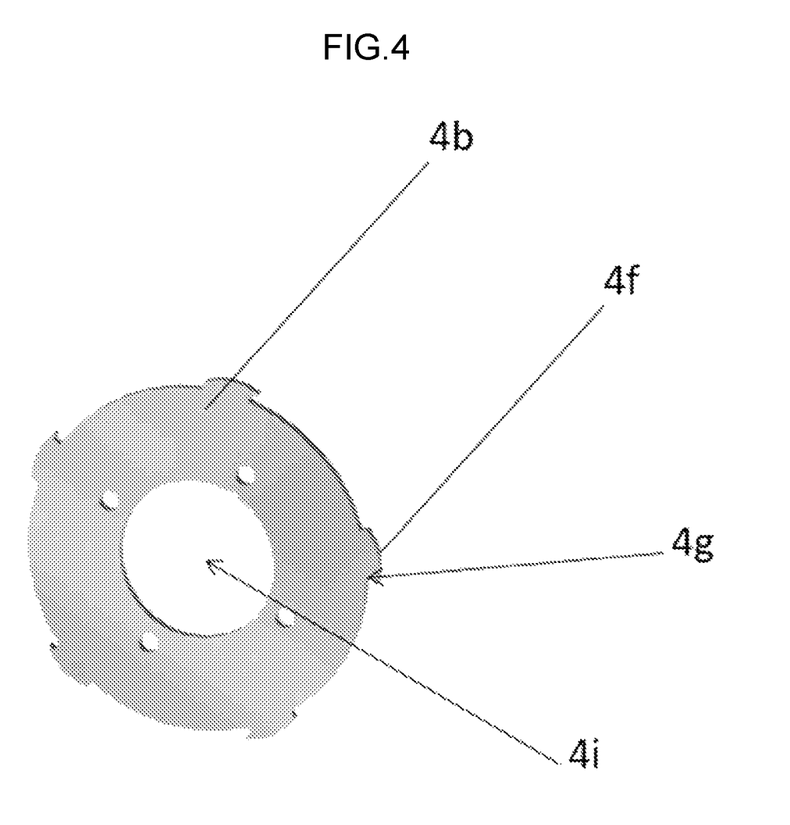
FIG. 4 illustrates a rear flange of the invention.
Figure 5:
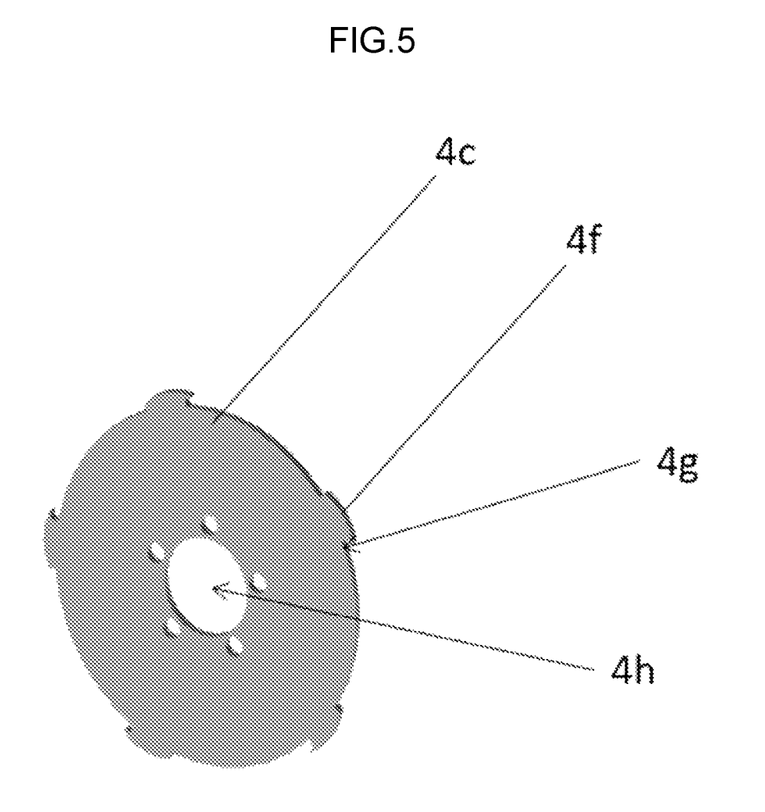
FIG. 5 illustrates a front flange of the invention.

FIGS. 4 and 5 illustrate flanges 4b, 4c fitted with such shoulders 4f. In order to enable the positional holding relative to the hollow cylinder 4a, each flange 4b, 4c includes at least two shoulders 4f, arranged especially diametrically opposed to each other. In order to have better holding, a larger number of shoulders 4f, for example five shoulders, are considered, arranged with a substantially constant angular deviation between them.

In order to further improve the positional holding of the flanges 4b, 4c relative to the hollow cylinder 4a, each shoulder 4f is fitted with a groove 4g on the end abutting with the hollow cylinder 4a during rotation of the flange 4b, 4c, so that the hollow cylinder 4a engages into the groove 4g during rotation. Such a groove 4g limits the radial translation of the flange 4b, 4c.

A rear flange 4c comprises an axial opening 4h and is secured to the hollow shaft 5 and the stator of the motor 3 via removable securing means, for example screw/bolt assemblies or blind rivets. Once secured, the axial opening 4h of the rear flange 4c corresponds to the external diameter of the body of the hollow shaft 5 so that the control cables and supply cables or hoses of the motor can be connected outside the cylindrical casing 4a, 4b, 4c.

In one particular embodiment, two rear flanges 4c are employed to avoid possible loosening of the hollow cylinder 4a due to system vibrations. They are then locked in opposite directions of rotation. The use of two flanges 4c thus attached to the hollow cylinder 4a and secured together via removable securing means to the hollow shaft eliminates the risk of disengagement of a flange 4c due to a rotation opposite to the direction of engagement of the shoulders 4f.

A front flange 4b also comprises an axial opening 4i, enabling, unlike the rear flanges 4c, the output shaft of the planetary gearset 2 to pass through. A front flange 4b also comprises at least two shoulders 4f each capable of cooperating with an assembly formed by an axial cut-out 4e and a peripheral cut-out 4d in the vicinity of one end of the hollow cylinder 4a. A groove 4g is also present at the end of each shoulder 4f intended to come into contact with the cylinder 4a.

A front flange 4b is secured to the case of the planetary gearset 2 via removable securing means, for example screw/bolt assemblies or blind rivets. Once secured, the axial opening of the rear flange 4c corresponds to the output shaft of the planetary gearset 2 so that the cylindrical casing 4a, 4b, 4c is not subject to the rotation of the output shaft.

As with the rear flanges 4c, in one particular embodiment, two front flanges 4b are employed. They are then locked in rotation in opposite directions. The use of two flanges 4b thus attached to the first external casing and secured together via the removable securing means to the hollow shaft 5 eliminates disengagement of one flange due to a rotation opposite to the direction of engagement of the shoulders into the hollow cylinder 4a.

The cylindrical casing 4a, 4b, 4c thus constituted isolates the geared motor 1 from the outside while providing an output for control cables and supply cables or hoses of the motor 3 on the one hand and for the output axle of the planetary gearset 2 on the other hand. The cylindrical casing 4a, 4b, 4c does not rest on a motor case and therefore enables the motor to be perfectly isolated from the outside and protects it from possible damage. In addition, the hollow axle 5 and the epicyclic output axle 2 define the axis of rotation of the geared motor 1, so that it can be easily integrated into a mechanical system without inducing eccentricity of movement. Indeed, it is easier to centre an axis relative to the mechanism than to centre an axis related to the rotor of a motor and a stator having a spatial extension. Besides, the cylindrical casing 4a, 4b, 4c has the additional advantage of being easily removable for maintenance of the motor or the planetary gearset. The state-of-the-art shows sealed geared motors in this respect, where maintenance involves destructive disassembly of the casing, thus implying that a new casing has to be re-created afterwards.

In one particular embodiment, the cylindrical casing 4a, 4b, 4c is additionally isolated from dust and/or water by the addition of sealing means at the junction between the flanges 4b, 4c and the hollow cylinder 4a, between the rear flanges 4c and the hollow axle 5 and/or between the front flanges 4b and the output shaft of the planetary gearset 2.

In order to form a tubular motor, the geared motor 1 thus constituted is arranged in a drum held at its two ends by shrouds 6b, 6c, enabling the rotational movement of the output axle of the planetary gearset 2 to be transferred to the drum.

Figure 6:
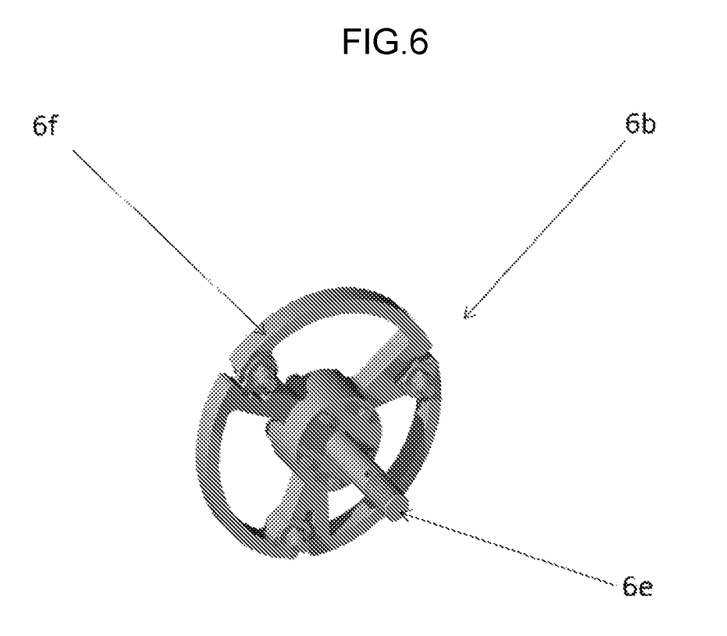
FIG. 6 illustrates a rear shroud of the invention.

The front shroud 6b, illustrated in FIG. 6, is attached to the output shaft of the planetary gearset 2 and to the drum. It comprises an axis of rotation 6e as well as outer attachment means 6f.

Figure 7:
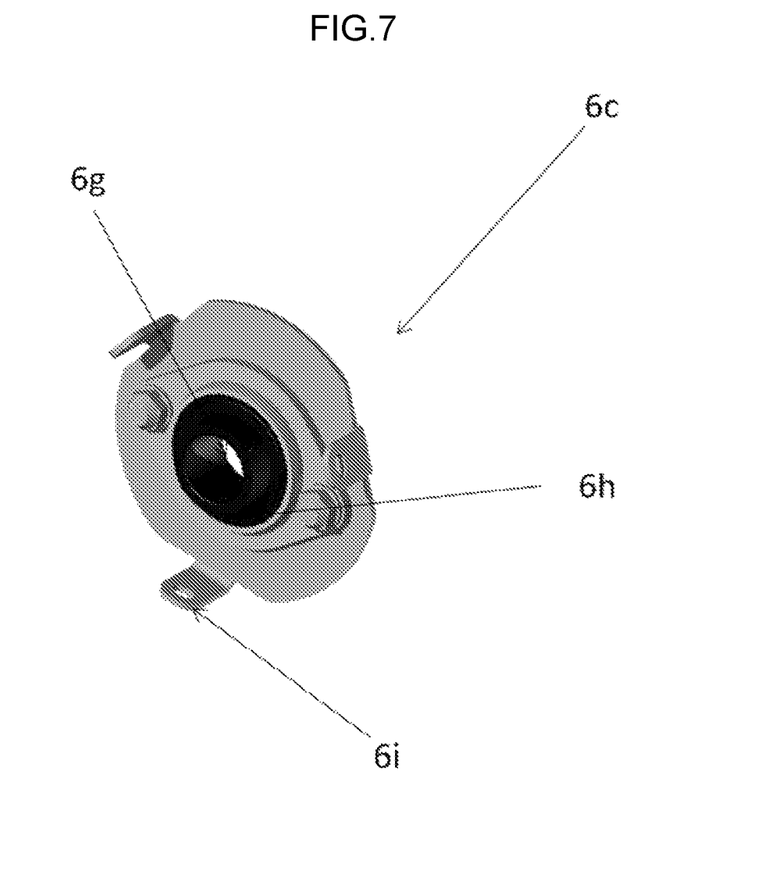
FIG. 7 illustrates a front shroud of the invention.

The rear shroud 6c, illustrated in FIG. 7, comprises a port 6g fitted with a bearing 6h through which the hollow shaft 5 is inserted. The bearing 6h may be a ball bearing or a mechanical seal. It enables the rotation of the drum to be decoupled relative to the hollow shaft 5. Like the front shroud 6b, the rear shroud 6c comprises outer attachment means 6i.

Outer attachment means 6f, 6i for attaching the drum to the shrouds, and possibly in addition, a larger rotating element.

These shrouds 6b, 6c ensure that the cylindrical casing 4a, 4b, 4b and the drum are coaxial, so as to avoid the formation of a reactive moment resulting from eccentricity of the drum which may lead to variations in the unwinding or winding speed of the rope.

The drum provides a contact or attachment surface for a larger rotating element. This is especially the case when the tubular motor is used in a winding/unwinding system, such as that of a removable cover.

The drum may be cylindrical or prism-shaped. Mention can especially be made of prisms with a square or hexagonal base which provide bearing surfaces for the drum to improve torque communication to a rotating surface.

The tubular motor thus defined can accept any motor of dimensions compatible with the cylindrical casing, arranged axially relative to the planetary gearset. Thus, although electric geared motors with such a configuration are commonly available, they have a low rotational speed and/or low torque.

Hydraulic or pneumatic axial geared motors are not currently available. Such hydraulic or pneumatic axial geared motors provide a high torque from hydraulic or pneumatic circuits on board a vehicle, especially heavy goods vehicles or rail vehicles, while keeping a reduced overall size.

Figure 8:
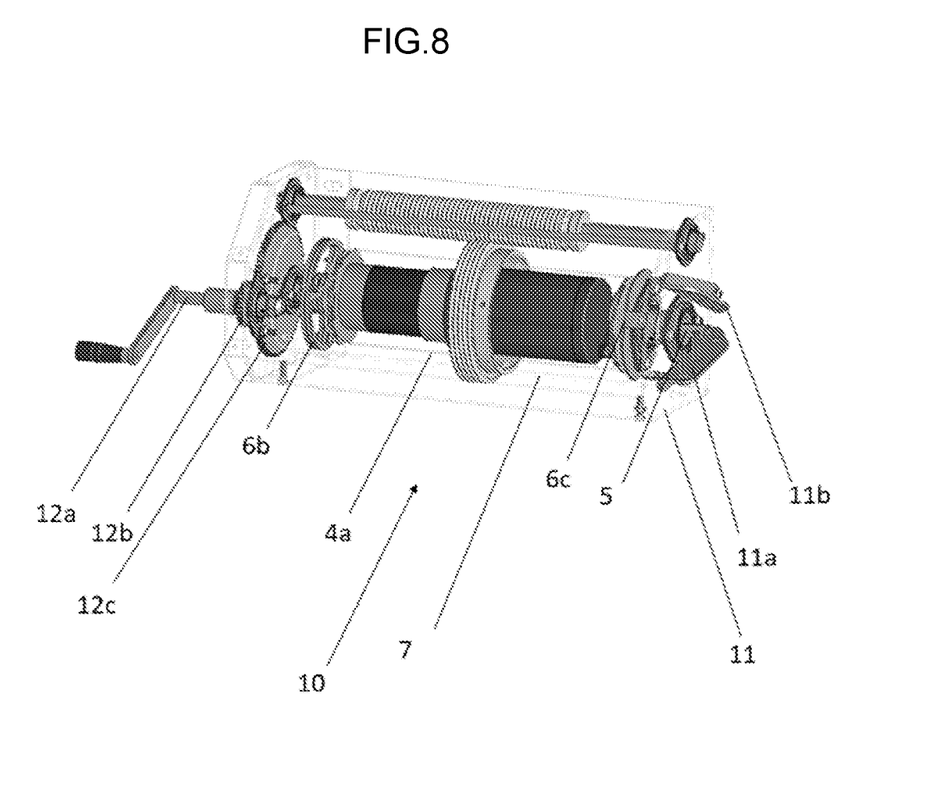
FIG. 8 illustrates an actuation system according to the invention.

In one particular embodiment, illustrated in FIG. 8, an actuation system 10 comprises a tubular motor as described above arranged in a trim 11, fitted with an attachment 11a, 11b to the hollow axle 5 of the rear shroud 6c, and a drive assembly 12b, 12c coupled to the front shroud 6b. The trim 11 is especially attached to the chassis of a vehicle or building so as to limit the feedback of the actuation.

The attachment 11a and 11b forms a clamp which cooperates with the flats 5b formed on the hollow axle 5 so as to prevent its rotation. The rotation of the motor is then transmitted to the drum 7. The drum 7 makes it possible to wind or unwind any fabric, cloth, cover, conveyor belt, cable or rope.

However, when a fault or supply problem occurs at the motor, the actuation system 10 is rendered inoperable.

In order to restore manual operation of the actuation system 10, the attachment 11a and 11b can be opened so that the hollow axle 5 is made rotatably free, while being held in position by the rear shroud 6c. The motor connections, especially hydraulic or pneumatic, are disconnected via quick couplings, so as to reduce inertia thereof. A crank 12a can then be connected to the drive assembly 12b, 12c so that it can rotate the drum via the axle of the front shroud 6b. The functions of the actuation system are restored to a manual mode of operation.

The drive assembly 12b, 12c may comprise gears, pinions and/or crown wheels. The careful choice of gear ratios of the selected elements enables the manual operation of the actuation system with a restricted force. It should be noted that the drive assembly comprises an element, not illustrated, which is arranged integrally with the axle 6e and is meshed with the other elements.

It should be noted that the attachment 11a and 11b and the drive assembly 12b, 12c are integral with the trim and the tubular motor via the shrouds. They then contribute to holding the tubular motor in an axial position. A seal illustrated in FIG. 8, integral with the trim 11, keeps the hollow axle aligned when the attachment 11a and 11b is opened.

Such an actuation system avoids the need for a costly, large size and high maintenance clutch to switch from motor actuation to manual actuation.

Additionally, the maintenance of an actuation system according to the invention enables removal of the tubular motor for exchange or repair while the drum remains in place in the system. This is particularly advantageous in that removal of the fabric, cloth, cover, conveyor belt, cable or rope wound on the drum is not required. This greatly reduces maintenance time and costs.

The invention claimed is:

1. A geared motor comprising a planetary gearset coupled to an output shaft of a motor, comprising a cylindrical casing isolating the geared motor from the outside and, a hollow shaft connected to the stator of the motor and aligned with the output shaft of the planetary gearset, wherein the cylindrical casing comprises a hollow cylinder, at least one front flange and at least one rear flange,
the at least one front flange being secured to the case of the planetary gearset, the at least one rear flange being secured to the hollow shaft,
the hollow cylinder being fitted, in the vicinity of each of its ends, with an assembly of peripheral cut-outs associated with axial cut-outs each extending from one end of the hollow cylinder to a peripheral cut-out,
the front flanges and the rear flanges each being fitted with axial ports and at least two shoulders, each shoulder configured for cooperating with an assembly formed by an axial cut-out and a peripheral cut-out in the vicinity of one end of the hollow cylinder so as to form the cylindrical casing and to lock it by rotation of the flanges relative to the hollow cylinder, the cylindrical casing comprising two front flanges and two rear flanges, each of the two front flanges and each of the two rear flanges being locked in opposite directions of rotation.

2. The geared motor according to claim 1, wherein the port of the rear flanges accommodates the hollow shaft.

3. The geared motor according to claim 1, wherein the port of the front flanges accommodates the output shaft of the planetary gearset.

4. The geared motor according to claim 1, wherein each flange comprises five shoulders, the hollow cylinder comprising a corresponding number of assemblies of radial and axial cut-outs.

5. The geared motor according to claim 1, wherein each shoulder is provided with a groove so that the hollow cylinder engages into the groove upon relative rotation of the shoulder and the hollow cylinder.

6. The geared motor according to claim 1, wherein the motor is an electric, hydraulic, pneumatic or oleo-pneumatic motor.

7. The geared motor according to claim 1, wherein the hollow shaft comprises a port through which the power supply and control of the motor passes through the cylindrical casing.

8. A tubular motor comprising a geared motor according to claim 1, wherein the geared motor comprises: a rotary drum extending around the cylindrical casing, a front shroud integral with the output axle of the planetary gearset of the geared motor, and a rear shroud freely rotatably resting on the hollow shaft of the geared motor, the shrouds being integral with the drum so that the rotation of the output axle of the planetary gearset is transmitted to the drum and the axis of rotation of the rotating drum is coaxial with the axis of rotation of the geared motor extending through the hollow shaft and the output shaft of the planetary gearset.

9. The tubular motor according to claim 8, wherein the rear shroud is fitted with a bearing cooperating with the hollow shaft so as to decouple the geared motor from the rotation of the rotating drum.

10. An actuation system comprising the tubular motor according to claim 8, wherein the tubular motor is disposed in a trim, the actuation system further comprising an attachment of the hollow axle of the rear shroud to the trim, and a drive assembly coupled to the front shroud and capable of receiving a crank, the attachment being adapted to be opened when the actuation system is actuated with the crank.

11. The actuation system according to claim 10, wherein the tubular motor is fitted with quick disconnect connectors so as to isolate the tubular motor from its power source when the actuation system is actuated with the crank.

* * * * *